United States Patent
Gopalakrishnan et al.

(10) Patent No.: US 7,760,695 B2
(45) Date of Patent: Jul. 20, 2010

(54) METHODS AND SYSTEMS FOR CENTRALIZED CLUSTER MANAGEMENT IN WIRELESS SWITCH ARCHITECTURE

(75) Inventors: Kamatchi Soundaram Gopalakrishnan, Milpitas, CA (US); Ajay Malik, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 701 days.

(21) Appl. No.: 11/529,988

(22) Filed: Sep. 29, 2006

(65) Prior Publication Data
US 2008/0080438 A1    Apr. 3, 2008

(51) Int. Cl.
*H04W 4/00* (2009.01)
*H04W 24/00* (2009.01)
*G06F 15/16* (2006.01)

(52) U.S. Cl. .............. 370/338; 455/456.1; 709/208
(58) Field of Classification Search ............ 370/338, 370/400
See application file for complete search history.

(56) References Cited

U.S. PATENT DOCUMENTS

| | | | |
|---|---|---|---|
| 6,088,346 A * | 7/2000 | Du et al. | 370/338 |
| 6,611,860 B1 * | 8/2003 | Ying | 709/208 |
| 6,636,499 B1 | 10/2003 | Dowling | |
| 6,785,552 B2 * | 8/2004 | Shinozaki et al. | 455/456.1 |
| 6,886,038 B1 * | 4/2005 | Tabbara et al. | 709/223 |
| 2003/0212777 A1 | 11/2003 | Kandefer et al. | |
| 2005/0271044 A1 * | 12/2005 | Hsu et al. | 370/360 |
| 2005/0289228 A1 | 12/2005 | Srikanth et al. | |

FOREIGN PATENT DOCUMENTS

EP    1575212 A    9/2005

OTHER PUBLICATIONS

International Search Report for International Application No. PCT/US2007/079823, mailed Apr. 16, 2008.

* cited by examiner

*Primary Examiner*—Steven H Nguyen
(74) *Attorney, Agent, or Firm*—Ingrassia, Fisher & Lorenz, P.C.

(57) ABSTRACT

Wireless switch are monitored or configured on a cluster basis rather than being limited to configuration on an individual switches. A switch cluster is made up of two or more wireless switches that share a cluster number or other identifier. A command is received from a user interface module at a first node in the cluster, and an instruction related to the command is transmitted from the first node to the other nodes in the cluster. After receiving responses from at least some of the other nodes in the cluster as to the effect of the instruction, the first node provides an updated response to the administrator. The administrator is therefore able to configure or monitor each of the nodes in the cluster from a single administrative node.

20 Claims, 3 Drawing Sheets

METHODS AND SYSTEMS FOR CENTRALIZED CLUSTER MANAGEMENT IN WIRELESS SWITCH ARCHITECTURE

TECHNICAL FIELD

The present invention relates generally to wireless local area networks (WLANs) and, more particularly, to cluster management of wireless switches in a WLAN.

BACKGROUND

In recent years, there has been a dramatic increase in demand for mobile connectivity solutions utilizing various wireless components and wireless local area networks (WLANs). This generally involves the use of wireless access points that communicate with mobile devices using one or more RF channels.

In one class of wireless networking systems, relatively unintelligent access ports act as RF conduits for information that is passed to the network through a centralized intelligent switch, or "wireless switch," that controls wireless network functions. In a typical WLAN setting, one or more wireless switches communicate via conventional networks with multiple access points that provide wireless links to mobile units operated by end users. The wireless switch, then, typically acts as a logical "central point" for most wireless functionality. Consolidation of WLAN intelligence and functionality within a wireless switch provides many benefits, including centralized administration and simplified configuration of switches and access points.

One disadvantage, however, is that malfunctions at the wireless switch can effect a significant portion of the wireless network. That is, if the wireless switch were to become unavailable due to power failure, malfunction, or some other reason, then the access points logically connected to that switch will typically also become unavailable. To reduce the effects of wireless switch unavailability, wireless switches commonly incorporate "warm standby" features whereby a backup switch is configured to take over if a primary switch becomes incapacitated. More recently, switches have been deployed in groups (e.g. so-called "clusters") that allow multiple switches within the group to share connection licenses and other information with each other. An example of one clustering technique is described in U.S. patent application Ser. No. 11/364,815 filed on Feb. 28, 2006 and entitled "METHODS AND APPARATUS FOR CLUSTER LICENSING IN WIRELESS SWITCH ARCHITECTURE". While clusters are useful in providing standby ability and backup features, they have in the past been cumbersome to configure and administer due to the frequent need to execute certain configurations on multiple machines within the cluster.

Accordingly, it is desirable to provide a configuration scheme that can allow for a centralized management feature for switches and other network devices operating within a group or cluster. Other desirable features and characteristics will become apparent from the subsequent detailed description and the appended claims, taken in conjunction with the accompanying drawings and the foregoing technical field and background.

BRIEF SUMMARY

According to various exemplary embodiments, wireless switches are monitored or configured on a cluster basis rather than being limited to configuration on an individual switches. A switch cluster is made up of two or more wireless switches that share a cluster number or other identifier. A command is received from a user interface module at a first node in the cluster, and an instruction related to the command is transmitted from the first node to the other nodes in the cluster. After receiving responses from at least some of the other nodes in the cluster as to the effect of the instruction, the first node provides an updated response to the administrator. The administrator is therefore able to configure or monitor each of the nodes in the cluster from a single administrative node. In various further embodiments, no single node in the cluster is selected as a master node for all commands, but rather multiple nodes are each capable of acting as the "master node" for processing particular commands at different times. This allows multiple nodes within the cluster to provide administrative updates or to gather monitoring data from each of the other members of the cluster, thereby improving efficiency and convenience to the administrator.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description.

Various aspects of the exemplary embodiments may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., radio-frequency (RF) devices, memory elements, digital signal processing elements, logic elements and/or the like, which may carry out a variety of functions under the control of one or more microprocessors or other control devices. In addition, the present invention may be practiced in conjunction with any number of data transmission protocols and that the system described herein is merely one exemplary application for the invention.

For the sake of brevity, conventional techniques related to signal processing, data transmission, signaling, network control, the IEEE 802.11 family of specifications, and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Without loss of generality, in the illustrated embodiment, many of the functions usually provided by a traditional wireless access point (e.g., network management, wireless configuration, and the like) can be concentrated in a corresponding wireless switch. It will be appreciated that the present invention is not so limited, and that the methods and systems described herein may be used in the context of other network environments, including any architecture that makes use of client-server principles or structures.

Figure 1:
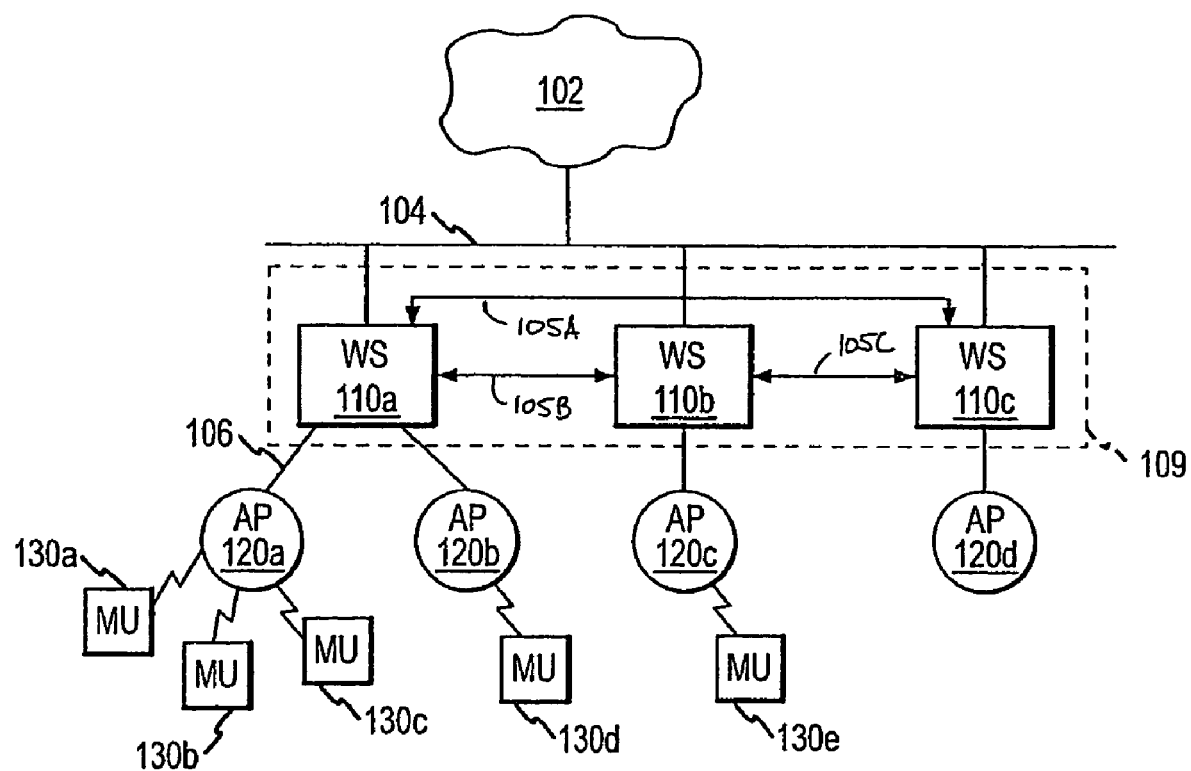
FIG. 1 is a conceptual overview of an exemplary wireless network with a three-switch cluster.

Referring now to FIG. 1, one or more switching devices 110 (alternatively referred to as "wireless switches," "WS," or simply "switches") are coupled via one or more networks 104 (e.g., an ETHERNET or other local area network coupled to one or more other networks or devices, indicated by network cloud 102). One or more wireless access ports 120 (alternatively referred to as "access ports" or "APs") are configured to wirelessly connect switches 110 to one or more mobile units 130 (or "MUs") after a suitable AP adoption process. APs 120 are suitably connected to corresponding switches 110 via communication lines 106 (e.g., conventional Ethernet lines). Any number of additional and/or intervening switches, routers, servers and other networks or components may also be present in the system. Similarly, APs 120 may have a single or multiple built-in radio components. Various wireless switches and access ports are available from SYMBOL TECHNOLOGIES of San Jose, Calif., although the concepts described herein may be implemented with products and services provided by any other supplier.

A particular AP 120 may have a number of associated MUs 130. For example, in the illustrated topology, MUs 130(a), 130(b) and 130(c) are logically associated with AP 120(a), while MU 130(d) is associated with AP 120(b). Furthermore, one or more APs 120 may be logically connected to a single switch 110. Thus, as illustrated, AP 120(a) and AP 120(b) are connected to WS 110(a), and AP 120(c) is connected to WS 110(b). Again, the logical connections shown in the figure are merely exemplary, and other embodiments may include widely varying components arranged in any topology.

Each AP 120 establishes a logical connection to at least one WS 110 through a suitable adoption process. In a typical adoption process, each AP 120 responds to a "parent" message transmitted by one or more WSs 110. The parent messages may be transmitted in response to a request message broadcast by the AP 120 in some embodiments; alternatively, one or more WSs 110 may be configured to transmit parent broadcasts on any periodic or aperiodic basis. When the AP 120 has decided upon a suitable "parent" WS 110, AP 120 transmits an "adopt" message to the parent WS 110.

Following the adoption process, each WS 110 determines the destination of packets it receives over network 104 and routes that packet to the appropriate AP 120 if the destination is an MU 130 with which the AP is associated. Each WS 110 therefore maintains a routing list of MUs 130 and their associated APs 130. These lists are generated using a suitable packet handling process as is known in the art. Thus, each AP 120 acts primarily as a conduit, sending/receiving RF transmissions via MUs 130, and sending/receiving packets via a network protocol with WS 110. Equivalent embodiments may provide additional or different functions as appropriate.

Wireless switches 110A-C are shown in FIG. 1 as being combined into a single set, group or "cluster" 109 to provide redundancy and convenience as appropriate. In various embodiments, if one or more switches 110A-C were to become unavailable for any reason, for example, then one or more other switches 110 in the cluster 109 could automatically absorb some or all of the functions previously carried out by the unavailable switch 110, thereby continuing service to mobile users 130 in a relatively smooth manner. In practice, clusters could be formed from any grouping of two or more wireless switches 110 that share a group identifier or other identification. A simple cluster could be made up of a primary switch 110 and a dedicated backup, for example, or of any number of primary switches with one or more backups. Alternatively, any number of active switches could provide redundancy for each other, provided that they are able to intercommunicate through networks 104 and/or 102. The cluster 109 made up of switches 110A-C, then, would allow any switch 110 in the cluster to absorb functions carried out by any other switch 110 if the other switch 110 were to become unavailable, and/or to otherwise provide for convenience of operation in any manner.

Redundancy is provided as appropriate. In various embodiments, switches 110A-C making up a cluster 109 suitably exchange adoption information (e.g. number of adopted ports, number of licenses available, etc.) as appropriate. This data exchange may take place on any periodic, aperiodic or other basis over any transport mechanism. The transmission control protocol (TCP) commonly used in the TCP/IP protocol suite, for example, could be used to establish any number of "virtual" connections 105A-C between switches operating within a cluster. In the event that wireless switch 110A in FIG. 1, for example, would become unavailable, switches 110B and 110C may have ready access to a relatively current routing list that would include information about APs 120A-B and/or MUs 130A-D previously associated with switch 110A. In such embodiments, either switch 110B-C may therefore quickly contact APs 120A-B following unavailability of switch 110A to take over subsequent routing tasks. Similarly, if switches 110B or 110C should become unavailable, switch 110A would be able to quickly assume the tasks of either or both of the other switches 110B-C. In other embodiments, the remaining switches 110 do not directly contact the APs 120 following the disappearance of another switch in the cluster, but rather adopt the disconnected APs 120 using conventional adoption techniques. Nodes 110A-C in a common cluster 109 may be logically addressed or otherwise represented with a common cluster identification code or the like.

Clusters may be established in any manner. Typically, clusters are initially configured manually on each participating WS 110 so that each switch 110 is able to identify the other members of the cluster 109 by name, network address or some other identifier. When switches 110A-C are active, they further establish the cluster by sharing current load information (e.g. the current number of adopted ports) and/or other data as appropriate. Switches 110A-C may also share information about their numbers of available licenses so that other switches 110 in cluster 109 can determine the number of cluster licenses available, and/or other information as appropriate.

In various embodiments, the time period between switch data exchanges is manually configured by the operator to allow flexibility in managing traffic on network 104. Alternatively, the timing and/or formatting of such messages may be defined by a protocol or standard. Establishing cluster 109 could therefore refer to either configuration of the cluster, and/or the establishment of cluster communication while the various nodes in cluster 109 are active.

During operation of the cluster 109, each switch 110A-C suitably verifies the continued availability of the other switches 110. Verification can take place through any appropriate technique, such as through transmission of regular "heartbeat" messages between servers. In various embodiments, the heartbeat messages contain an identifier of the particular sending switch 110. This identifier is any token, certificate, or other data capable of uniquely identifying the particular switch 110 sending the heartbeat message. In various embodiments, the identifier is simply the media access control (MAC) address of the sending switch 110. MAC addresses are uniquely assigned to hardware components, and therefore are readily available for use as identifiers. Other embodiments may provide digital signatures, certificates or other digital credentials as appropriate, or may simply use the device serial number or any other identifier of the sending switch 110. The heartbeat messages may be sent between switches 110 on any periodic, aperiodic or other temporal basis. In an exemplary embodiment, heartbeat messages are exchanged with each other switch 110 operating within cluster 109 every second or so, although particular time periods may vary significantly in other embodiments. In many embodiments, if a heartbeat message from any switch 110 fails to appear within an appropriate time window, another switch 110 operating within cluster 109 adopts the access ports 120 previously connected with the non-responding switch 110 for subsequent operation.

Figure 2:
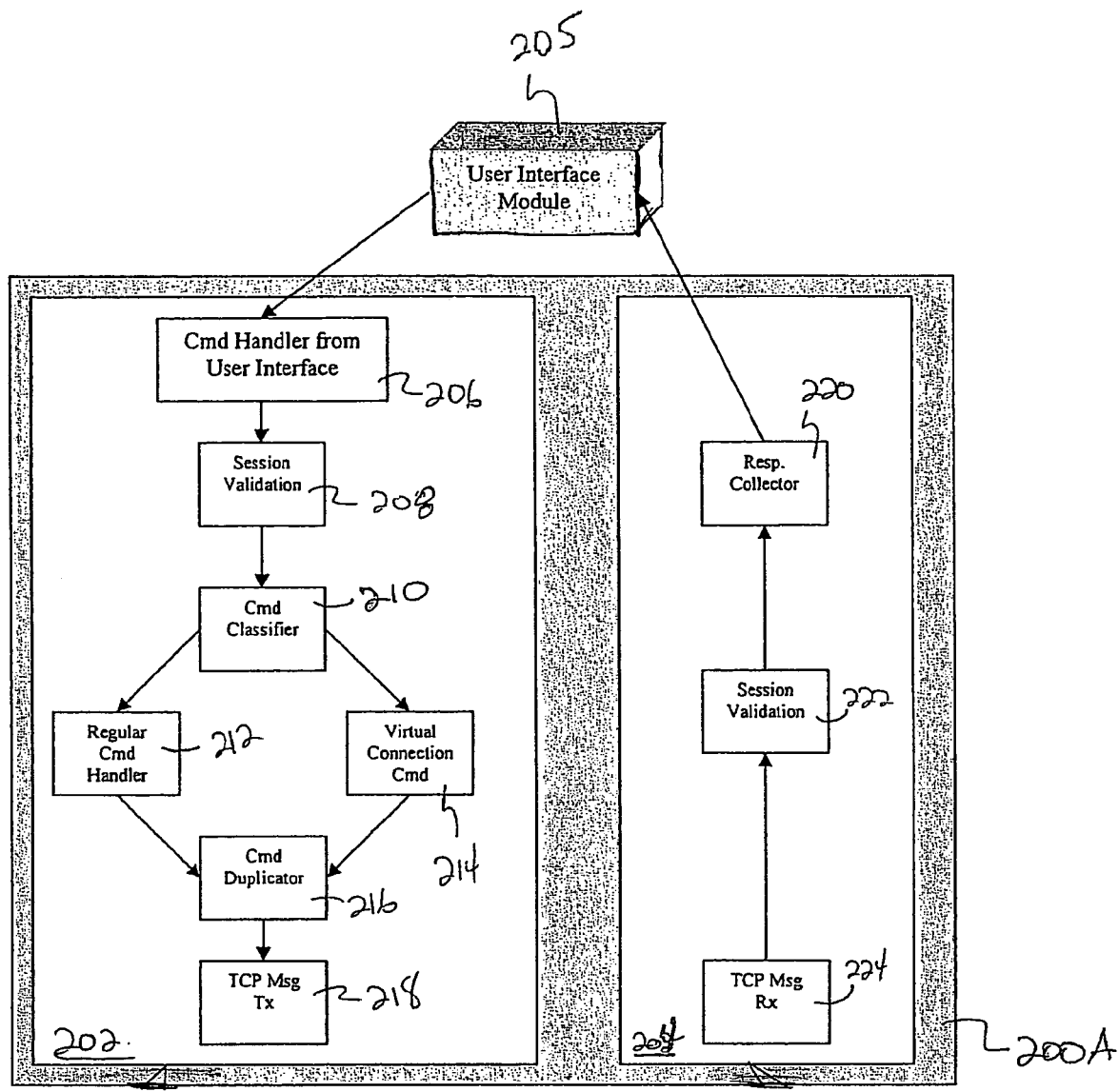
FIG. 2 is a block diagram of an exemplary cluster manager module used to originate a cluster command.

Clustering techniques can also be used to aid in the administration, configuration and/or monitoring of multiple switches 110 from one or more monitoring nodes. With reference now to FIG. 2, an exemplary cluster management module 200 suitably includes a transmit side 202 and a receive side 204 corresponding to transmitting and receiving messages for cluster management and/or monitoring. In various embodiments, each switch 110 (FIG. 1) within a cluster 109 can execute one or more copies of the cluster management module, thereby allowing any switch 110 to become the "master" node for executing a particular command or request on other "slave" nodes, as described more fully below.

Transmit side 202 is any hardware, firmware, software and/or other logic capable of effecting the transmission of messages on network 104 (FIG. 1) to other switches 110. In various embodiments, transmit side 202 includes command handler logic 206 for receiving a command from an administrator, session validation logic 208, command classifier logic 210, command handler modules 212, 214 and/or 216, as well as message transmit logic 218. Similarly, receive side 204 is any logic capable of processing messages received on network 104 (FIG. 1), such as any sort of receive logic 224, validation logic 222 and/or response collector logic 220. Each of the various "logic" modules may be implemented with any type of hardware, software and/or firmware logic, including any sort of interpreted or compiled software instructions stored on any type of digital storage medium. Frequently, software instructions are stored within flash memory and/or a disk drive or other storage medium associated with one or more switches 110A-C.

In operation, configuration and/or monitoring instructions are received from an administrative user via any sort of interface module 205. Interface module 205 may be any type of command line interface (CLI), graphical user interface (GUI), simple network management protocol (SNMP) node, and/or the like. Interface module 205 may logically reside on the same switch 110 as cluster manager 200, or may be located at any other processing platform. In various embodiments, interface module executes as a JAVA applet, ACTIVE-X control or the like within a client web browser that communicates with a hypertext transport protocol (HTTP) server executing on a switch 110 for receiving configuration instructions.

Commands provided from user interface module 205 are appropriately received at command handler logic 206. The command is validated (e.g. by session validation module 208) to ensure that the command emanated from an approved source (e.g. by an administrator operating in an approved configuration session established with a userid/password or other credential) and/or to otherwise ensure that the command is valid for execution within environment 100. The command is then provided to classification logic 210, which appropriately determines whether the command is a regular command that can be processed locally on the host switch 110, or whether the command requests access to other switches 110 via virtual connections 109A-C (FIG. 1). In various embodiments, handler modules 212, 214 are provided for each of the various commands recognized by manager module 200. That is, a "request status" command may be implemented in separate logic from a "change parameter" command, although this is certainly not necessary in all embodiments.

In various embodiments, the user places the management module 200 into a "cluster management mode" by activating cluster commands at a CLI or GUI interface or the like. For example, an administrator may enter a "cluster enable" or similar command at user interface 205 that indicates to module 214 that commands that make use of virtual connections 105 (FIG. 1) may be forthcoming. In other embodiments, however, this modal aspect need not be present, and cluster commands may be readily intermixed with commands intended solely for the host node.

For commands intended to be executed on multiple nodes 110 within cluster 109, such commands may be duplicated (e.g. using logic 216) so that corresponding instructions are transmitted across virtual connections 105A-C (FIG. 1) or the like using transmit logic 218. As briefly noted above, the nodes operating within cluster 109 may be inter-connected by TCP "virtual circuits" or the like. Alternatively, user datagram protocol (UDP) packets or the like could be used, albeit with a decline in reliability. Cluster commands are nevertheless transmitted across network 104 to the other nodes 110A-C in cluster 109 as appropriate.

After the receiving nodes 110A-C process the instruction transmitted by the sending node, typically a response is sent. The responses from the various nodes 110A-C are received at cluster manager 200 via logic 224, which appropriately validates the session 222, collects responses 220, and provides the collected response to user interface module 205. In various embodiments, a timeout feature is provided so that the response to user interface 205 is provided after a period of time even though one or more responses from receiving nodes 110A-C might not have been received. That is, responses received prior to the timeout are processed differently from any responses received after the timeout period. This timeout feature allows for further response or analysis by the administrator in the event that one or more receiving nodes 110A-C become unavailable or inaccessible during operation.

Figure 3:
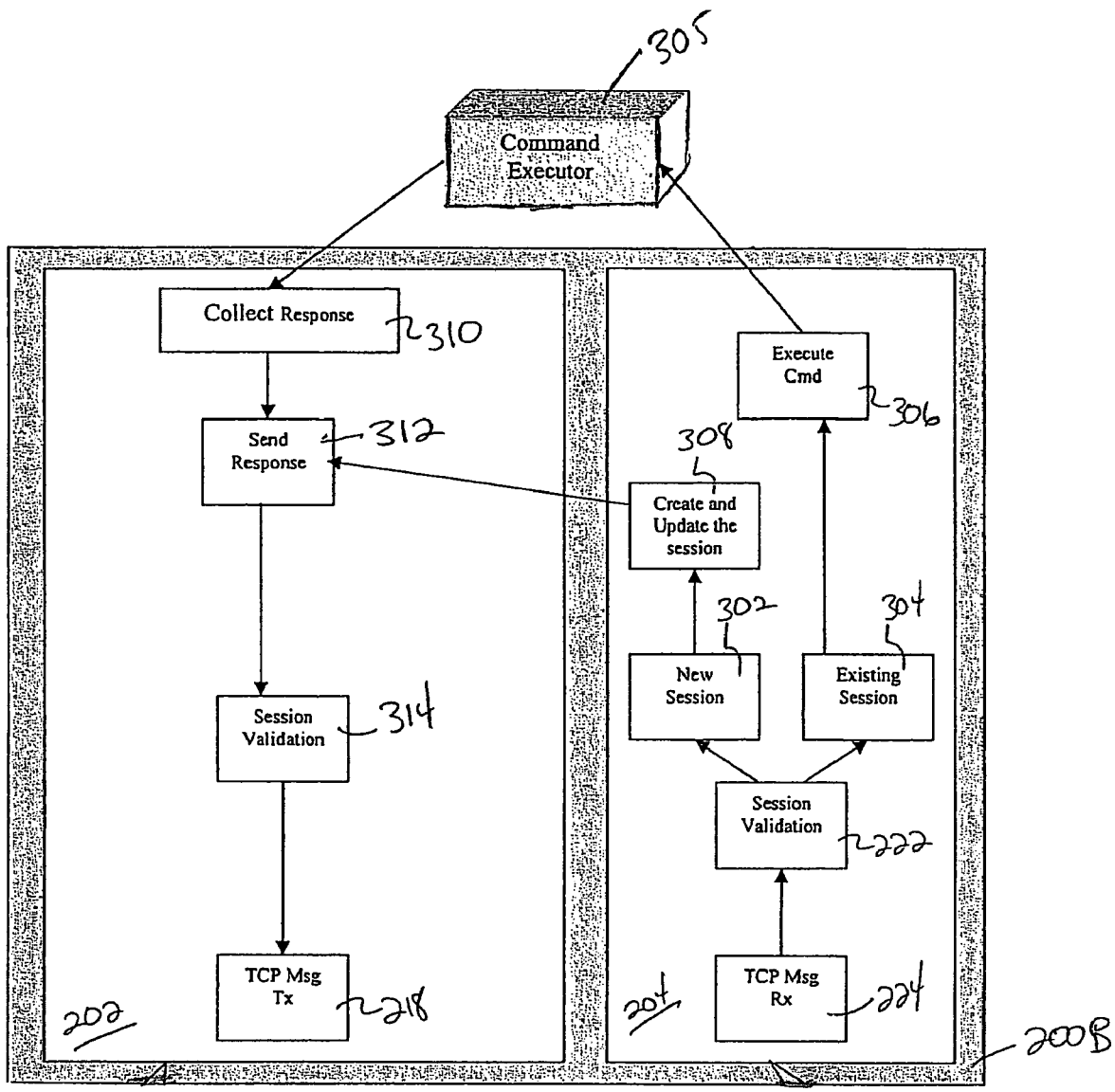
FIG. 3 is a block diagram of an exemplary cluster manager module used to receive a cluster command.

FIG. 3 shows a block logic diagram of processing executing at a node 110A-C that is receiving a cluster instruction from another node 110A-C. With reference to FIG. 3, cluster manager application 200B suitably includes a transmit side 202 and a receive side 204, as described in conjunction with the cluster management application 200A described in FIG. 2. In various embodiments, multiple nodes within cluster 109 include identical (or at least similar) application logic 200 so that each node 110 is capable of acting as the "master" node for certain commands while acting as a "slave" or "client" to commands provided by other nodes acting as "master" nodes. When each node 110A-C in the cluster 109 is capable of acting as the configuration "master", the network manager enjoys improved flexibility. Moreover, this avoids the need to provide custom software on particular "management" nodes 110 that is different from that residing on non-management nodes within the cluster.

This concept can be further expanded in that "slave" or "client" nodes need not be part of the same logical cluster 109 as the "master" node 110 in all embodiments. That is, commands can be issued on network 104 (or even network 102) to any client node that is reachable by any sort of addressing, broadcast and/or routing scheme. To that end, any node 110A-C can act as a "master" and/or "client" to any other node 110A-C within system 100 so long as security is maintained in an appropriate manner. Security may be verified through access control lists, userid/password combinations or other credentials, routing lists, and/or the like. In still other embodiments, configuration or monitoring commands can be broadcast to all nodes 110 listening on a particular network 104/105, with results provided to the user interface module 205 based upon the nodes 110 that respond to the broadcast instruction. To that end, many different control and/or monitoring schemes can be formulated within the ambit of the concepts set forth herein.

To respond to cluster instructions received from another node 110, the instruction is received at receiving logic 224 via network 104 and/or virtual connection 105. The session is again validated to ensure that the message was transmitted by a valid node 110 using any appropriate credential at validation logic 222. In the event that the instruction requests a new management session (logic 302), the new session can be created (logic 308) and a response is sent back to the originating node 110 as appropriate. If the instruction is sent to an existing session operating on the receiving node 110 (logic 304), then the command can be executed (logic 306) by an appropriate executor 305. Command executors 305 may provide data in response to a query, may adjust one or more operating parameters of the node, and/or may take other actions as appropriate.

Responses are received from the command executor 305 at logic 310, and a response is prepared for transmission to the node originally requesting the command. The session is again validated (logic 314) to ensure that the response is provided in a secure manner, and the validated message is transmitted back to the requesting node 110 via logic 218.

The particular aspects and features described herein may be implemented in any manner. In various embodiments, the processes described above are implemented in software that executes within one or more wireless switches 110. This software may be in source or object code form, and may reside in any medium or media, including random access, read only, flash or other memory, as well as any magnetic, optical or other storage media. In other embodiments, the features described herein may be implemented in hardware, firmware and/or any other suitable logic.

It should be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method executable by any of a plurality of networked nodes that are logically arranged in a cluster arrangement, wherein each of the plurality of networked nodes comprises a cluster management module and wherein any one of the plurality of networked nodes is able to be configured as a master node for executing a particular command and as a slave node for responding to other networked nodes acting as the master node for other commands, the method comprising the steps of:

establishing, using the cluster management module associated with a first one of the plurality of network nodes, virtual network connections between the first one of the plurality of network nodes and each of the other nodes in the cluster arrangement;

receiving the particular command from a user interface module at the cluster management module associated with the first one of the plurality of networked nodes in the cluster arrangement;

in response to receiving the particular command, the first one of the plurality of networked nodes acting as the master node for executing the particular command by transmitting an instruction related to the particular command from the first one of the plurality of networked nodes to each of the other nodes in the cluster arrangement via the virtual network connections;

receiving responses from at least some of the other nodes in the cluster arrangement at the cluster management module associated with the first one of the plurality of networked nodes via the virtual network connections, wherein the responses indicate an effect produced by the instruction; and providing a response to the user interface module from the cluster management module associated with the first one of the plurality of networked nodes.

2. The method of claim 1 further comprising the step of validating the particular command at the first one of the plurality of networked nodes prior to the transmitting step.

3. The method of claim 1 further comprising the step of validating the responses from the at least some of the other nodes prior to the providing step.

4. The method of claim 1 wherein the receiving step comprises a timeout wherein the responses received prior to a predetermined time are processed differently from the responses received after the predetermined period of time.

5. The method of claim 1 further comprising the steps of:

receiving the instruction from the first one of the plurality of networked nodes at a second one of the plurality of networked nodes in the cluster arrangement;

executing the particular command in response to the instruction at the second one of the plurality of networked nodes;

collecting the response to the particular command; and forwarding the response to the first one of the plurality of networked nodes.

6. The method of claim 5 further comprising the steps of:

receiving the instruction from the first one of the plurality of networked nodes at a third one of the plurality of networked nodes in the cluster arrangement;

executing the particular command in response to the instruction at the third one of the plurality of networked nodes;

collecting the response to the particular command; and forwarding the response to the first one of the plurality of networked nodes.

7. The method of claim 1 wherein the cluster arrangement is identifiable by a cluster identification code, and wherein the virtual network connections are established using the cluster identification code.

8. The method of claim 1 wherein the cluster arrangement is identifiable by a cluster identification code.

9. The method of claim 1 further comprising responding to a second instruction received from another of the plurality of networked nodes acting as a second master node for executing a second particular command.

10. The method of claim 9 wherein the responding comprises acting as the slave to the second master node.

11. A wireless switch configured to operate as one of a plurality of wireless switches arranged in a cluster arrangement, wherein any one of the plurality of wireless switches is able to be configured as a master of the cluster arrangement for executing a particular command and as a slave to another wireless switch in the cluster arrangement for responding to other wireless switches for other commands, the wireless switch comprising a cluster arrangement module configured to:
- establish virtual network connections between the cluster management module of the wireless switch and each of the other nodes in the cluster arrangement;
- receive the particular command from a user interface module at the cluster management module of the wireless switch;
- operate, in response to receiving the particular command, the wireless switch as the master to execute the particular command from the user interface module by transmitting an instruction related to the particular command to each of the other switches in the cluster arrangement via the established virtual network connections and by receiving responses via the virtual network connections from at least some of the other switches indicating an effect produced by the instruction; and
- provide a response from the cluster management module to the user interface module from the wireless switch to the user interface module, wherein the response to the user interface module indicates the effect produced by the instruction based upon the responses from the at least some of the other switches.

12. The wireless switch of claim 11 further comprising:
- receiving a second instruction from a second one of the plurality of wireless switches;
- executing a second command in response to the second instruction;
- collecting the response to the second command; and
- forwarding the response to the second one of the plurality of wireless switches.

13. The wireless switch of claim 11 wherein the cluster management module is further configured to respond via the to a second instruction received from another of the plurality of wireless switches acting as a second master for executing a second particular command.

14. The wireless switch of claim 13 wherein the cluster management module is configured to act as the slave to the second master.

15. A system for processing wireless data communications using a network, the system comprising:
- a user interface module configured to communicate using the network; and
- a plurality of wireless switches configured to operate with each other in a cluster arrangement, wherein each of the plurality of wireless switches is configured to communicate with other switches in the cluster arrangement via virtual network connections across the network, and wherein each of the plurality of wireless switches comprises a cluster management module configured to communicate with the user interface module via the network to thereby receive an instruction from the user interface module, to act as a master node that transmits the instruction to other wireless switches operating in the cluster arrangement via the virtual network connections, to receive responses via the virtual network connections from at least some of the other wireless switches indicating effects produced by the instruction, and to provide a response to the user interface module that indicates the effects produced by the instruction based upon the responses from the at least some of the other wireless switches.

16. The system of claim 15 wherein the cluster arrangement is based upon a common cluster identifier shared between each of the plurality of wireless switches operating in the cluster arrangement.

17. The system of claim 15 wherein the cluster management module operating in each of the plurality of wireless switches comprises a transmit portion and a receive portion.

18. The system of claim 17 wherein the transmit portion of the cluster management module is configured to duplicate the instruction for transmission to each of the other wireless switches operating in the cluster arrangement.

19. The system of claim 18 wherein each of the plurality of wireless switches comprise a command executor configured to locally execute the instruction and to provide an execution response.

20. The system of claim 19 wherein the transmit portion of the cluster management module operating in each of the plurality of wireless switches is further configured to receive the execution response from the command executor and to transmit the execution response to the master node via the virtual network connections as one of the responses indicating effects produced by the instruction.

* * * * *

UNITED STATES PATENT AND TRADEMARK OFFICE
CERTIFICATE OF CORRECTION

PATENT NO.        : 7,760,695 B2
APPLICATION NO.   : 11/529988
DATED             : July 20, 2010
INVENTOR(S)       : Gopalakrishnan et al.

It is certified that error appears in the above-identified patent and that said Letters Patent is hereby corrected as shown below:

IN THE CLAIMS

1. In Column 9, Lines 46-47, in Claim 13, delete "via the to a second" and insert -- via the second --, therefor.

Signed and Sealed this
Eighth Day of November, 2011

David J. Kappos
*Director of the United States Patent and Trademark Office*